Dec. 24, 1957 — A. C. WHITNEY — 2,817,346
TENT STAKE
Filed April 1, 1955

INVENTOR.
ARTHUR C. WHITNEY
BY
McMorrow, Berman & Davidson
ATTORNEYS

United States Patent Office 2,817,346
Patented Dec. 24, 1957

2,817,346
TENT STAKE

Arthur C. Whitney, Chicago, Ill.

Application April 1, 1955, Serial No. 498,553

1 Claim. (Cl. 135—15)

This invention relates to tent stakes or pegs, and more particularly has reference to a stake novelly designed to facilitate attachment of the tent ropes thereto.

Heretofore, it has been proposed to provide tent stakes with hook-like ends about which a tent rope may be engaged. However, to my knowledge all the previous tent stakes devised along this line have had the hook-like formations integrally or otherwise rigidly secured to the body portions of the stakes. As a result, should the body portions become bent, the entire stake must necessarily be discarded or alternatively, an attempt must be made to straighten the stake with the hook formation thereon. Not only does the hook formation make it difficult to straighten the stake under these circumstances, but further, the hook is sometimes damaged during the straightening operation.

In view of the above, it is one object of the present invention to provide a stake shank which is formed separately from the hook assembly, so that the hook assembly can be removed from said shank whenever desired, thus to permit replacement or repair of the shank without difficulty.

Another object of importance is to provide a tent stake as described in which the hook has a particular shape that is especially adapted to prevent cutting or tearing of the rope, while still insuring that the rope will be held securely connected to the tent stake.

A further object is to provide interchangeable hooks and shanks in a tent stake, so that a single hook can be assembled with any one of a plurality of shanks differing from one another in respect to the length thereof.

A further object of importance is to provide a hook as described which, when assembled with an associated shank, is rotatable about the axis of the shank as necessary, thus to properly locate the hook relative to the rope attached thereto, the hook in effect being self adjusting about the axis of the stake shank in this regard.

Other objects will appear from the following description, the claim appended thereto, and from the annexed drawing, in which like reference characters designate like parts throughout the several views, and wherein:

Figure 2:
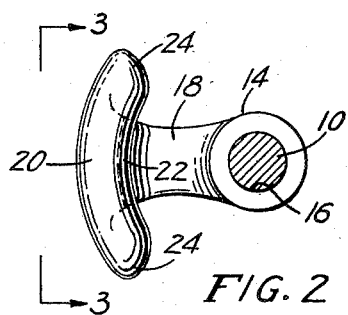
Figure 2 is a transverse sectional view on line 2—2 of Figure 1.

The illustrated stake comprises an elongated shank 10 having at one end a ground penetrating point 11 and formed at its other end with an enlarged, flattened, peened over head 12 which can be struck with a sledge, hammer, or the like when the stake is being driven into the ground G.

Removably assembled with the shank 10 is a hook 14 which comprises an open ended sleeve 14 having an axial bore 16 of a diameter substantially equal to the diameter of the shank 10 and slidably engaged on the shank 10. The sleeve is thus freely shiftable longitudinally of the shank, and is also freely rotatable about the axis of the shank.

Figure 3:
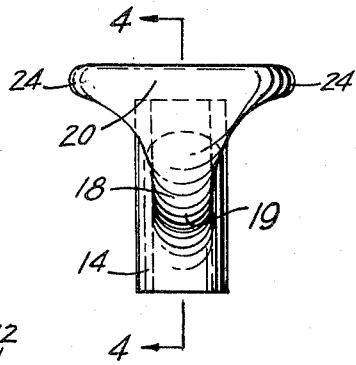
Figure 3 is an elevational view of the hook per se as seen from line 3—3 of Figure 2.
Figure 4:
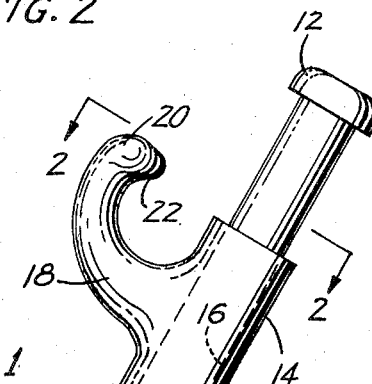
Figure 4 is a vertical section through the hook assembly on line 4—4 of Figure 3.
Figure 1:
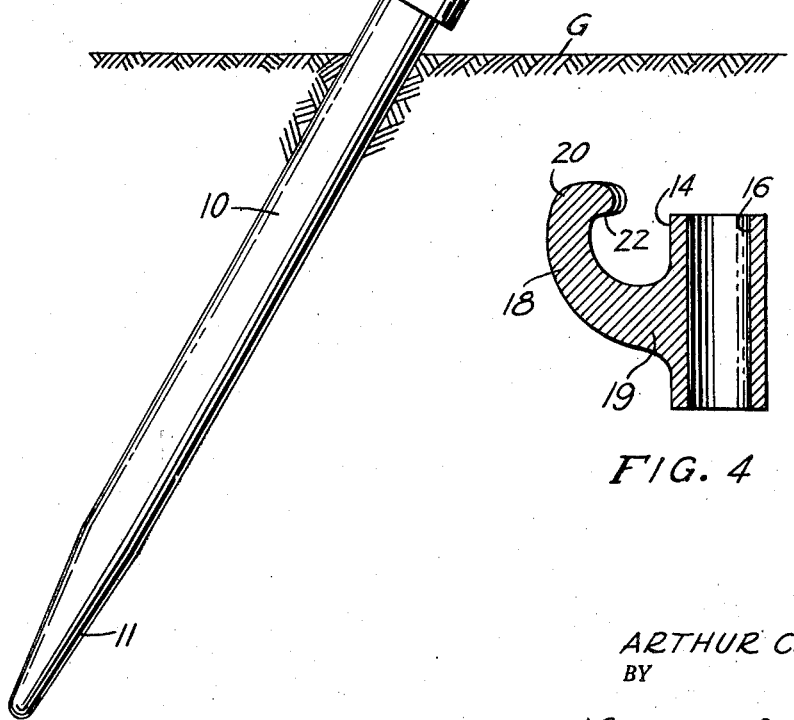
Figure 1 is a side elevational view of a tent stake formed according to the present invention.

Integrally formed upon the sleeve 14, intermediate the opposite ends thereof, is a lateral, upturned hook 18. The hook 18 has a relatively narrow upwardly curved inner end portion 19 which, as shown in Figure 3, progressively increases in width in the direction of its upper or free end. The inner end portion 19 is fixed secured to the sleeve 14 and projects laterally outwardly from the sleeve approximately normal to the axis of the sleeve.

At its free end the inner end portion 19 terminates in a relatively wide head 20 which, as shown in Figure 2 is longitudinally curved in approximate concentric relation to the axis of the sleeve 14. The inner longitudinal edge portion of the cross head 20 projects toward the sleeve 14 to define an overhang or lip 22, which is adapted to engage a rope or the like, not shown, on the hook so as to prevent removal of the rope from the hook. The lip 22, at its opposite ends, has projections 24, which also serve to prevent a rope on the hook from sliding off the hook.

When the stake is driven into the ground, the hook is adapted to be shifted longitudinally of the stake to a selected location, and is also freely rotatable about the axis of the stake shank. Then, the rope can be secured thereto, and as will be noted the particular formation of the hook is such as to prevent tearing of the rope, while at the same time insuring that the rope will be securely connected to the tent stake. Only rounded surfaces having gently curving contours are presented to the hook engaging areas of the rope. This prevents fraying of the rope, as will be readily appreciated. Further, the rope, when knotted about the hook element or looped about said element, engages under the lip 22, and also engages under the projecting end portions of the cross head, thus to securely hold the rope in place. The hook of course is freely rotatable to in effect be self adjusting so far as its position relative to the rope is concerned, so that as the rope pulls upon the hook in a particular direction, the hook rotates in that direction as necessary, so as to dispose the cross head broadside to the length of the rope.

It is believed apparent that the invention is not necessarily confined to the specific use or uses thereof described above, since it may be utilized for any purpose to which it may be suited. Nor is the invention limited to the specific construction illustrated and described, since such construction is only intended to be illustrative, it being considered that the invention comprehends any minor change in construction that may be permitted within the scope of the appended claim.

What is claimed is:

In a tent stake, an elongated shank, a sleeve circumposed on said shank and having upper and lower ends, a hook comprising a relatively narrow inner end portion having an inner end fixed to the sleeve between the ends of the sleeve and having a free outer end, said inner end portion being curved in a laterally outward and upward direction between its ends, and a relatively wide head fixed on the outer end of said inner end portion, said head having projections on its outer ends projecting beyond opposite sides of said inner end portion, said head being longitudinally curved substantially concentrically with the axis of the sleeve and having an inner side having thereon a longitudinal lip projecting inwardly from the head toward said sleeve.

References Cited in the file of this patent

UNITED STATES PATENTS

| 212,775 | Williams | Feb. 25, 1879 |
| 314,168 | Davis | Mar. 17, 1885 |
| 1,592,128 | Steinbreder | July 13, 1926 |

FOREIGN PATENTS

| 40,364 | Sweden | Mar. 15, 1916 |
| 1,027,588 | France | Feb. 18, 1953 |